United States Patent [19]
Schmidt

[11] 3,921,738
[45] *Nov. 25, 1975

[54] SPRING BALANCE

[75] Inventor: Karl Otto Schmidt, Idar-oberstein, Germany

[73] Assignee: Firma Gebrueder Schmidt, Idar-Oberstein, Germany

[ * ] Notice: The portion of the term of this patent subsequent to Mar. 26, 1991, has been disclaimed.

[22] Filed: Jan. 3, 1974

[21] Appl. No.: 430,390

Related U.S. Application Data
[63] Continuation-in-part of Ser. No. 393,755, Sept. 4, 1973, Pat. No. 3,799,282.

[30] Foreign Application Priority Data
Aug. 13, 1973  Germany.......................... 2340838

[52] U.S. Cl................................ 177/230; 177/173
[51] Int. Cl.² ........................................ G01G 23/26
[58] Field of Search............ 177/DIG. 5, 7, 225–234

[56] References Cited
UNITED STATES PATENTS

| | | | |
|---|---|---|---|
| 238,841 | 3/1881 | Brackett | 177/DIG. 5 |
| 2,148,523 | 2/1939 | Baerman | 177/DIG. 5 |
| 2,445,023 | 7/1948 | Colman | 177/DIG. 5 |
| 2,475,684 | 7/1949 | Weckerly | 177/DIG. 5 |
| 3,089,553 | 5/1963 | Gast | 177/1 |
| 3,123,165 | 3/1964 | Garson | 177/208 |
| 3,185,232 | 5/1965 | Iwasaki | 177/225 |
| 3,532,175 | 10/1970 | McFayden | 177/230 |
| 3,799,282 | 3/1974 | Schmidt | 177/230 |
| 3,826,320 | 7/1974 | Terraillon | 177/230 |
| 3,831,688 | 8/1974 | Phipps | 177/225 |

*Primary Examiner*—Stephen J. Tomsky
*Assistant Examiner*—Vit W. Miska
*Attorney, Agent, or Firm*—Ernest G. Montague; Karl F. Ross; Herbert Dubno

[57] ABSTRACT

A load-supporting platform of a weighing scale has a stem rigid with a vertical member of a spring-loaded parallelogrammatic linkage which includes two generally horizontal levers, the upper lever carrying a depending boss terminating in a pin which engages in a radial slot of a deflection wheel, rotatable about a vertical axis offset from that pin, to which a weight-indicating pointer is attached. The slot, extending generally parallel to the pivotal axes of the levers, is wide enough to afford a certain amount of play for the pin motion and is lined along one edge with a magnet which attracts the magnetically permeable pin onto that edge as soon as the system has come to rest.

6 Claims, 2 Drawing Figures

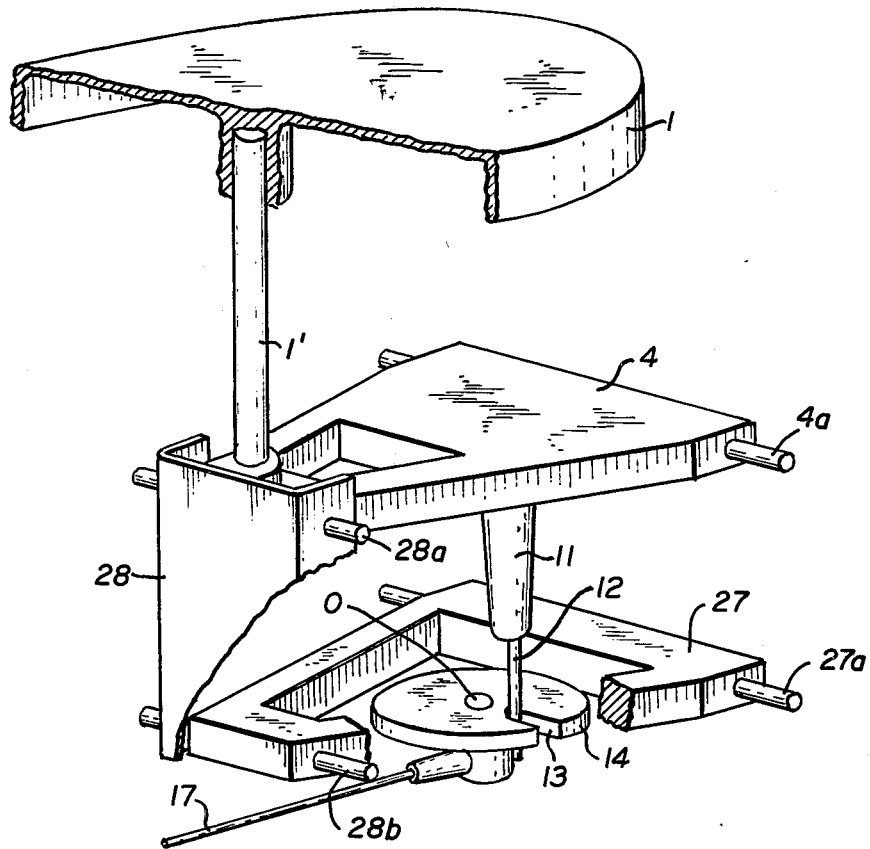
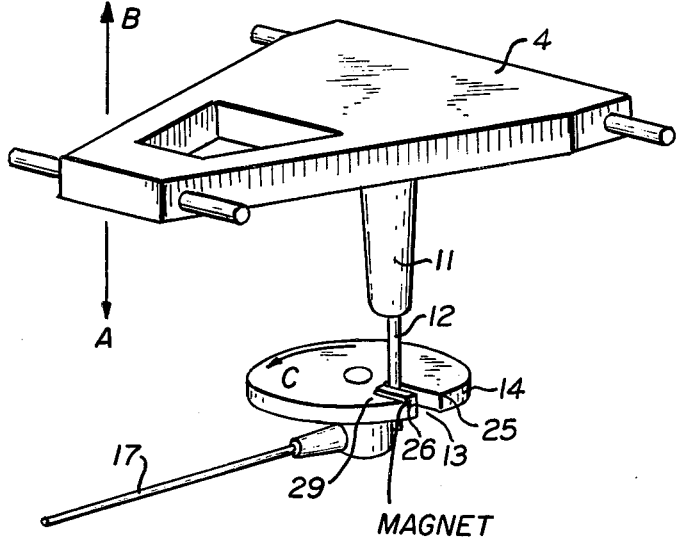

SPRING BALANCE

This application is a continuation-in-part of my copending application Ser. No. 393,755 filed Sept. 4, 1973, now U.S. Pat. No. 3,799,282.

The present invention relates to an improvement in the deflection system of a weighing scale, more particularly a spring balance, in which a pointer is horizontally deflected in response to vertical movement of a load-receiving platform or pan linked therewith by a lever system.

It is an object of the present invention to provide improved means for operatively coupling the platform or balance pan with the pointer in order to indicate as accurately as possible weight of a load placed on a platform.

It is another object of the present invention to insure more precise guidance of the pointer by the associated lever system throughout the entire operating range of the balance.

The weighing scale according to my invention comprises a parallelogrammatic linkage including a pair of parallel levers with horizontal axes lying one above the other underneath the load-receiving platform or balance pan, the latter being rigid with a vertical member of that linkage articulated to the two levers for downward movement under load against a spring force. A depending projection on the underside of one of these levers, specifically the upper one, engages in a radial slot of a deflecting element (i.e. a wheel) which entrains the pointer and which is rotatable about a vertical axis offset from that projection, the slot being generally parallel to the pivotal lever axes so that the projection imparts rotation to the deflecting element in response to a vertical movement of the platform.

Since the displacement of the linkage by the platform inclines the projection at varying angles to the vertical in deflecting the pointer, the slot of the deflecting element must have a certain width to afford the necessary play. On the other hand, the position of this element should be well defined with reference to the projection and therefore to the platform with which the latter is positively linked. For this purpose, pursuant to a more particular feature of my invention, I provide the projection and the deflecting element with magnetically coacting portions attracting the projection onto an edge of the slot, more particularly that edge toward which the projection is urged by the spring force whereby the opposite, active edge of the slot is relieved of pressure when the system comes to rest. In an advantageous embodiment, one of these coacting portions is a magnet on the deflecting element opposite its active edge, the other being an actively or passively ferromagnetic pin forming part of the depending projection; it is, however, also possible to magnetize only the pin and to provide the first-mentioned slot edge with a passive ferromagnetic armature.

The above and other features of my invention will become apparent from the following detailed description given with reference to the accompanying drawing, in which:

FIG. 1 is a perspective view, partially broken away, of a spring balance in accordance with the present invention; and FIG. 2 is a perspective view showing part of the deflection system of FIG. 1 provided with magnetic means in accordance with the present invention.

The weighing scale shown in FIG. 1 has a construction which will be recognized as similar to that disclosed in my prior U.S. Pat. No. 3,799,282. A generally horizontal lever 4, pivotally mounted at 4a on a nonillustrated support, carries on its underside a depending boss 11 to which a pin 12 is fastened. The tip of pin 12 engages in a radial slot 13 of a horizontal deflection wheel 14 whose vertical axis 0 is offset from the pin 12. Lever 4 forms part of a parallelogrammatic linkage also including a second lever 27, pivotally mounted on its support at 27a, and a vertical member 28 rigid with a stem 1' of a load-receiving platform or balance pan 1, this member being articulated to the upper and lower levers 4, 27 at 28a and 28b, respectively. The wheel 14 is framed by the lever 27.

Upon downward deflection of levers 4 and 27 (arrow A, FIg. 2) against the balancing force of a nonillustrated spring (arrow B), pin 12 deviates its normal from vertical position and rotates the deflection wheel 14 in accordance with the tilting of the lever 4 (arrow C). Therefore the slot 13 must be sufficiently wide to prevent any clamping of the pin throughout the entire range of operation of the balance.

In a vertical or near vertical position of the pin, therefore, considerable play exists between the slot edges and the pin. Thus, a horizontal pointer 17 mounted on the deflection wheel 14 no longer positively follows the movements of the lever system but can assume different positions within the limits of the play present.

This drawback is obviated, as shown in FIG. 2, by mounting a magnet 26 on the deflection wheel 14 along an edge 29 of the slot 13 and, the pin 12 being made of a ferromagnetic material so as to form an armature for this magnet.

The edge 29 lined by the magnet 26 is located opposite the working edge 25 of the slot 13, i.e., the edge upon which the pin 12 leans when a weight is placed on the balance pan 1. The magnetic force therefore reduces the friction along the active edge 25. Upon the depression of the lever 4, the boss 11 together with the pin is inclined rearwardly and presses against the working edge 25 to turn the deflection wheel 14 together with the pointer 17 in a counterclockwise sense. When the lever 4 comes to a stop, the deflection wheel 14 is attracted to the pin 12 by the force of the magnet 26.

While I have disclosed one embodiment of the present invention, it is to be understood that this embodiment is given by way of example only and not in a limiting sense.

I claim:
1. A weighing scale comprising:
   a load-receiving platform;
   a pair of parallel levers with horizontal pivotal axes lying one above the other underneath said platform, said levers forming part of a parallelogrammatic linkage further including a vertical member rigid with said platform articulated to said levers for downward movement under load against a spring force;
   a depending projection on the underside of one of said levers;
   a deflecting element rotatable about a vertical axis offset from said projection, said element having a radial slot generally parallel to said pivotal axes, said projection engaging in said slot for rotating said element about said vertical axis in response to a vertical movement of said platform; and a substantially horizontal pointer coupled with said element for rotary entrainment thereby.

2. A weighing scale as defined in claim 1 wherein said projection and said element have magnetically coacting portions attracting said projection onto an edge of said slot.

3. A weight scale as defined in claim 1 wherein said projection is mounted on the underside of the upper one of said levers, said element being framed by the lower one of said levers.

4. A weighing scale as defined in claim 2 wherein said coacting portions include a magnet mounted on said element at said edge and a pin of ferromagnetic material forming part of said projection.

5. A weighing scale as defined in claim 2 wherein said edge lies on the side of said slot toward which said projection is urged by said spring force.

6. A weighing scale as defined in claim 3 wherein said element is a wheel.

* * * * *